Jan. 1, 1952     J. F. HOFFER     2,580,781
FLEXIBLE DRIVE COUPLING
Filed April 13, 1948
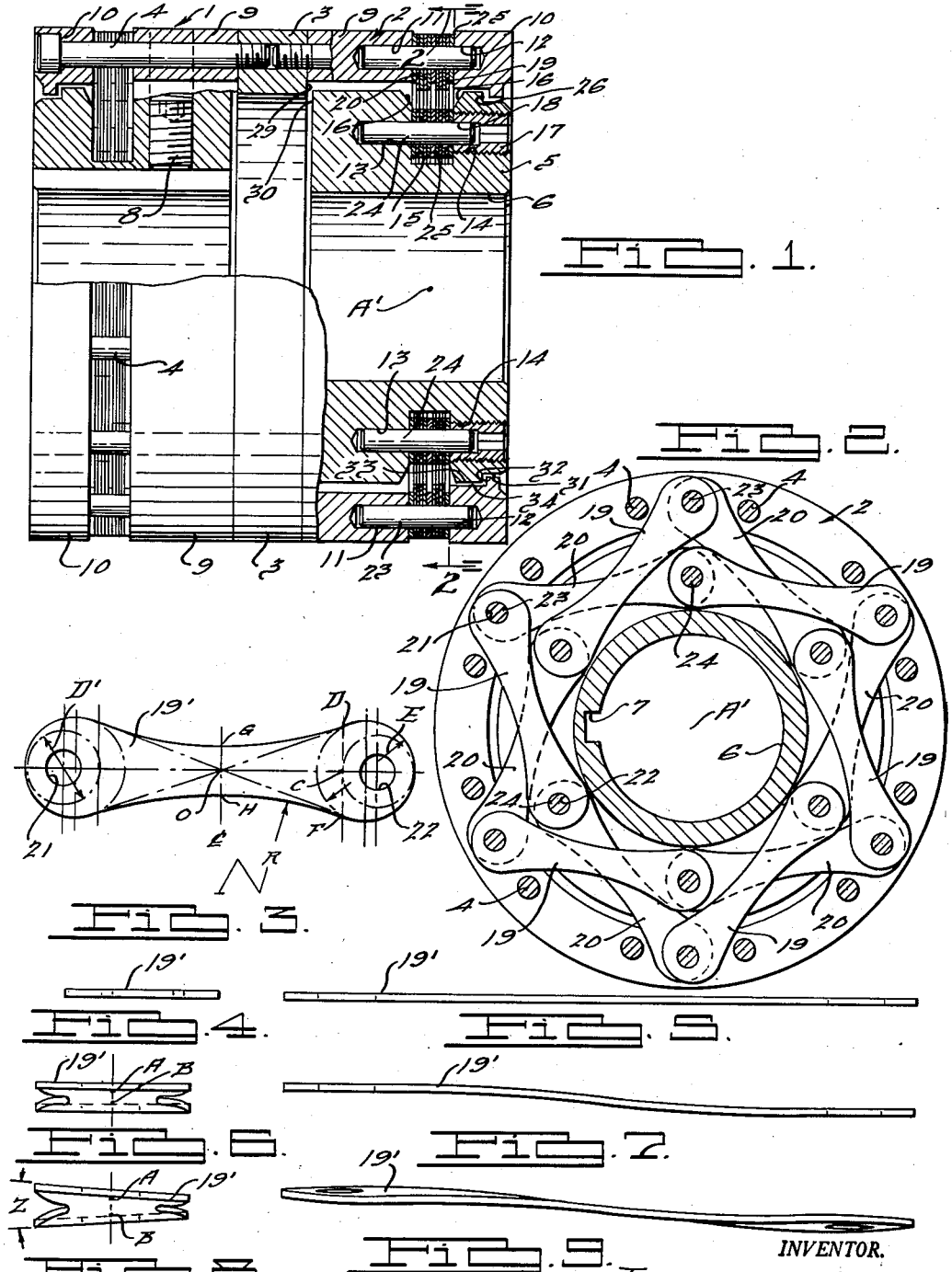
INVENTOR.
James F. Hoffer.
BY
ATTORNEYS.

Patented Jan. 1, 1952

2,580,781

UNITED STATES PATENT OFFICE 2,580,781

FLEXIBLE DRIVE COUPLING

James F. Hoffer, Detroit, Mich.

Application April 13, 1948, Serial No. 20,711

1 Claim. (Cl. 64—12)

The present invention relates to flexible drive couplings for shafts, and particularly relates to improvements in the type of coupling disclosed in my copending application, Serial No. 784,355, filed November 6, 1947.

The primary object of the present invention is to provide an improved flexible coupling of the non-backlash, non-wearing type, and having flexible spoke construction in which the maximum spoke stresses are reduced under all conditions of misalignment of the coupled shafts.

A further object is to provide a flexible spoke type drive coupling in which the contour of the flexible spokes comprises in its entirety a series of large blending radii in order to reduce peripheral stress concentrations under all conditions of misalignment of the coupled shafts.

A further object is to provide a flexible spoke type drive coupling in which the spoke areas under maximum stress can be increased in width without increasing the overall coupling dimensions.

A further object is to provide a flexible spoke type drive coupling which will permit more misalignment of the coupled shafts than in prior couplings.

Other objects of the invention will become apparent from the following specification, the drawing relating thereto, and from the claims hereinafter set forth.

In the drawing, in which like numerals are used to designate like parts in the several views throughout:

Figure 1 is a vertical cross-sectional view, with parts in elevation, of a flexible coupling embodying features of the present invention;

Fig. 2 is a cross-sectional view taken substantially along the line 2—2 of Fig. 1;

Fig. 3 is a plan view of the improved spoke form according to the present invention;

Figs. 4 and 5 are enlarged end and side elevations, respectively, of a single spoke leaf shown undeflected as assembled in an unmounted coupling, or in a coupling mounted on perfectly aligned coupling shafts;

Figs. 6 and 7 are similar end and side elevation views, respectively, of a single spoke leaf shown with exaggerated deflection as in a coupling mounted on coupled shafts which are in perfect parallel and angular alignment, but with the shafts forcing the coupling hubs toward or away from each other; and Figs. 8 and 9 are similar end and side elevations, respectively, of a single spoke leaf shown with exaggerated deflection as in a coupling mounted on coupled shafts which are out of parallel alignment, angular alignment, or both.

Referring to the drawing, a flexible coupling according to the present invention is illustrated, which comprises a pair of identical flexible coupling units, generally indicated at 1 and 2, which are spaced apart by a spacer 3. The units 1 and 2 are secured to the spacer 3 and to each other by means of a plurality of spaced screws 4. The screws 4 are received through aligned openings in the units 1 and 2 and are threaded into tapped openings in the spacer 3.

Each of the flexible coupling units 1 and 2 comprises an inner hub member 5, having a central axial opening 6 therethrough and provided with a keyway 7. The drive, or driven, shaft is disposed in the opening 6 in one of the units; and the driven, or drive, shaft is disposed in the opening 6 of the other unit and keyed thereto within the keyway 7. A set screw 8 is disposed within a tapped opening in the hub member and engages the key in the keyway to secure the shaft to the hub.

The hub 5, which may be the driving or driven member of the coupling, is encircled by driven or driving members 9 and 10 which are generally in the form of rings. The rings 9 and 10 form a unit which is flexibly connected to the hub unit 5 in a manner to be described. Each of the members 9 and 10 has a plurality of aligned or facing openings 11 and 12 therethrough, which are disposed on axes parallel to the axis of the opening 6. In the embodiment illustrated, there are six of such aligned openings shown. Corresponding axially aligned openings 13 and 14 are provided in the hub member 5 which communicate with an annular groove 15 formed through the periphery of the hub member 5 and terminate in outwardly flared annular edges 16, the groove 15 corresponding to the space between the members 9 and 10. Clamp screws 17 are received in the tapped openings 14 and have the inner ends provided with axial openings 18 which are aligned with the openings 13.

The members 9 and 10 are interconnected with the hub member 5 by means of two identical sets of spring steel, laminated flexible spokes 19 and 20. The shape and the manner in which they are formed are matters of considerable importance in accomplishing the purpose of the present invention. The spokes 19 and 20 are provided with openings 21 at their outer ends and openings 22 at their inner ends, which receive pins 23 and 24, respectively, therethrough.

The ends of pins 23 are received within openings 11 and 12, and the ends of pins 24 are received within openings 13 and 18. Spacing washers 25 are disposed on pins 23 and 24 between the laminated spokes 19 and 20, and between the outside faces of the spokes at the adjacent surfaces of members 5, 9, 10, and screw 17. The peripheral edges of the washers are rounded.

The inner ends of the spokes 19 and 20 are rigidly clamped to the hub member 5 by means of six clamp screws 17, and the outer ends of the spokes 19 and 20 are rigidly clamped to members 9 and 10 by means of the twelve screws 4, there being one of each screws closely adjacent to the opposite side of each of the pins 23. The ends of the spokes 19 and 20 are thus firmly secured to the hub member 5 and the rim members 9 and 10 so that all backlash is eliminated under all driving conditions.

The spacing washers 25 serve to space the spokes from the adjacent surfaces of members 5, 9 and 10, and screw 17, and from each other sufficiently to permit adequate spoke deflection without interference from the adjacent surfaces, and sufficiently to prevent contact between the spokes 19 and 20 under conditions of maximum misalignment.

The spokes 19 and 20 each comprises a multiplicity of laminated layers of thin leaves of spring steel, or other materials of similar characteristic, indicated at 19'. As mentioned above, they are tightly clamped at both of their ends to prevent movement of the leaves at the area of attachment, thus eliminating friction and wear under all conditions of operation.

The leaves of the spokes 19 and 20 are preferably stamped from sheet metal stock in which the arrangement is such that the grain or fibre of the strip stock induced by the steel rolling process runs longitudinally in the stock, and the grain or fibre in each spoke leaf runs longitudinally in each spoke leaf.

The spokes 19 and 20 are arranged in a crisscross pattern within a plane of minimum thickness so that rotatively and concentrically the rim members 9 and 10 are rigidly connected to the hub 5. This arrangement permits free relative angular and axial displacement of hub 5 with respect to rim members 9 and 10, within the desired limits. Excessive deflection of the flexible spokes 19 and 20 is prevented by positively limiting angular and axial movement of hub 5 relative to rim members 9 and 10 by limiting the clearance space therebetween. It is pointed out as shown in the drawing that the inner annular surface of the spacer 3 projects radially inwardly beyond the outer peripheral surface of the hub member 5. The outer face of the hub member 5 is provided with an annular reduced portion 26 and the ring member 10 has an inwardly directed annular flange 32 formed thereon, adjacent the surface of the reduced portion 26. The outer annular surface of the hub 5 is also spaced from the inner annular surfaces of the ring members 9 and 10, the inner annular surface of ring member 10 being closer to its adjacent surface of hub member 5 than the corresponding inner annular surface of ring member 9.

Angular movement of the hub member 5 with respect to member 9 and member 10 centers approximately at point A', the theoretical center of the plane of spokes 19 and 20. It can be readily seen that maximum relative angular displacement of the hub 5 about point A will cause approximately simultaneous abutment of surfaces 29 and 30 at some point and surfaces 31 and 32 at a diametrically opposite point. A relatively small clearance is provided between cylindrical surfaces 33 and 34 respectively, so that in case of some accident causing spoke failure, the rim assembly comprising all of the outer parts securely bolted together, will rotate about hub 5 with surfaces 33 and 34 serving as emergency bearing surfaces. The rim assembly will thus remain in sufficiently close radial alignment to prevent damage in such an emergency to the coupled machines and danger to personnel during the period required to stop the machines.

Referring to Figs. 3 through 9, the diameter D' at both ends of the leaf defines the leaf area under compression, due to the clamping action of screws 4 and 17 through washers 25. The clamping pressure is adequate, with a factor of safety, to provide enough friction to pull the heaviest load for which the coupling is rated.

When the coupling is operating on misaligned shafts, each spoke leaf goes through two cycles of deflection, as shown in Figs. 8 and 9, per each revolution of coupling, with deflection angle Z changing from positive to negative, and deflection distance AB changing from positive to negative. If half of the spring leaf, at opposite sides of the transverse centerline, deflects 50% of the angle Z and 50% of the distance AB, each side half can be considered a cantilever-type beam, solidly anchored over the area defined by diameter D', the extended portion of the beam having a length CO. If the extended portion of the beam had the triangular shape FOD, the stresses in the beam induced by deflection distance one-half AB would be practically uniform through the extended portion of the beam. It can be seen that the arcuate leaf form which is formed on the radius R on both sides of each leaf more closely approaches the ideal triangular beam form than a regular leaf form would. With the leaf form having the arcuate sides shown with width GH much narrower than the distance DF, the beam stresses are only slightly greater in the vicinity of the line DF than at other sections of the beam, and much lower at this vicinity of highest stress than would be the case with a rectangular leaf form.

Another important advantage of the leaf form 19' results from the fact that the stresses induced by deflection through angle Z are greatest in the lowest stressed portion of the leaf at GH. Conversely, the stresses induced by deflection through angle Z are lowest at the highest stressed portion of the leaf, at DF.

The compound deflection shown exaggerated in Figs. 8 and 9 shows the increased flexibility of the leaf form 19', having the reduced width at the center and the increased width at the ends.

In operation, the major drive load is taken by the spoke leaves longitudinally in tension; i. e., in the direction of the grain or fibre of the steel. The tension stresses due to full-rated drive load are very light at the reduced center section of the leaf as this section is not subject to bending stresses. However, the stresses in the vicinity of the line DF due to the drive load are much higher under conditions of shaft misalignment because of the increased sharpness of the deflection curve induced by the drive load. Therefore, with the specific leaf form 19', the combined stresses in the highest stressed area along the line DF have been reduced by increasing the stresses at the lowest stressed area along the line GH.

Formal changes may be made in the specific embodiment of the invention disclosed without departing from the spirit and substance of the invention the scope of which is commensurate with the appended claim.

What is claimed is:

A flexible coupling comprising driving and driven members disposed in encircling and spaced relationship with each other, a plurality of angularly disposed flexible leaf elements interconnecting said members and uniformly spaced therearound, means including pins rigidly connecting the outer ends of said elements to one of said members, and means including other pins rigidly connecting the inner ends of said elements to the other of said members, said elements being of substantially uniform thickness and having pin receiving apertures at each end thereof receiving said pins therethrough disposed at a distance from the adjacent end which is substantially less than the distance of said aperture from the lateral edges of said element and the transverse dimension intermediate the ends thereof being substantially less than the transverse dimensions adjacent the end thereof.

JAMES F. HOFFER.

REFERENCES CITED

The following references are of record in the file of this patent:

UNITED STATES PATENTS

| Number | Name | Date |
| --- | --- | --- |
| 557,162 | Sperry | Mar. 31, 1896 |